US 10,583,718 B2

(12) United States Patent
Adachi

(10) Patent No.: US 10,583,718 B2
(45) Date of Patent: Mar. 10, 2020

(54) VEHICLE REAR STRUCTURE

(71) Applicant: TOYOTA JIDOSHA KABUSHIKI KAISHA, Toyota-shi, Aichi-ken (JP)

(72) Inventor: Yoshiyuki Adachi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/161,729

(22) Filed: Oct. 16, 2018

(65) Prior Publication Data

US 2019/0135094 A1 May 9, 2019

(30) Foreign Application Priority Data

Nov. 7, 2017 (JP) ................. 2017-214706

(51) Int. Cl.
B60J 5/10 (2006.01)
B60Q 1/00 (2006.01)
B60Q 1/26 (2006.01)
B60Q 1/30 (2006.01)

(52) U.S. Cl.
CPC ............ B60J 5/107 (2013.01); B60Q 1/0005 (2013.01); B60Q 1/0035 (2013.01); B60Q 1/2638 (2013.01); B60Q 1/30 (2013.01)

(58) Field of Classification Search
CPC ... B60J 5/10; B60J 5/101; B60J 5/107; B60Q 1/0005; B60Q 1/0035; B60Q 1/2638
See application file for complete search history.

(56) References Cited

U.S. PATENT DOCUMENTS

| | | | | |
|---|---|---|---|---|
| 2012/0248814 A1* | 10/2012 | Tsukiyama | ............... | B60J 5/101 296/146.8 |
| 2016/0176272 A1* | 6/2016 | Rejc | ......................... | B60J 5/107 296/146.5 |
| 2018/0056762 A1 | 3/2018 | Adachi | | |
| 2018/0111457 A1* | 4/2018 | Mori | ....................... | B60J 10/70 |
| 2018/0194210 A1* | 7/2018 | Adachi | .................. | B60R 13/07 |
| 2018/0194407 A1* | 7/2018 | Adachi | .................... | B60J 5/101 |
| 2019/0023108 A1* | 1/2019 | Escoffier | ................. | B60J 5/107 |
| 2019/0135094 A1* | 5/2019 | Adachi | .................... | B60Q 1/30 |

FOREIGN PATENT DOCUMENTS

| | | |
|---|---|---|
| EP | 3187349 A1 | 7/2017 |
| FR | 3049243 A1 | 9/2017 |
| JP | 2010-030465 A | 2/2010 |
| JP | 6380488 B2 | 8/2018 |

* cited by examiner

Primary Examiner — Gregory A Blankenship
(74) Attorney, Agent, or Firm — Oliff PLC

(57) ABSTRACT

A rear structure of a vehicle includes a flip-up back door for opening and closing an opening formed in the rear part of the vehicle. The back door has lamp fitting recesses, into which rear lamps are fitted, extending inwardly from the ends of the back door in the vehicle width direction which are recessed in a vehicle inner side. The lamp fitting recesses are provided, on its bottom walls, with flow restraint recesses extending in upward and downward directions in the lamp fitting recesses which are recessed in the vehicle inner side. The lamp fitting recesses are provided with, on portions or the lower walls thereof that are located more outwardly in the vehicle width direction than the flow restraint recesses, inclined parts in which lower walls of the lamp fitting recesses are inclined downward toward the rear of the vehicle or the outside in the vehicle width direction.

5 Claims, 6 Drawing Sheets

VEHICLE REAR STRUCTURE

TECHNICAL FIELD

The present invention relates to a rear structure of a vehicle.

BACKGROUND ART

A rear structure of a vehicle comprising a flip-up type back door for opening and closing an opening formed in the vehicle has been known. Known back doors used in such rear structures of vehicles comprise, for example, lamp fitting recesses formed so as to be recessed into the vehicle inner side and into which lamps are fitted. In particular, Patent Literature 1 discloses a rear structure of a vehicle configured such that such lamp fitting recesses extend inwards from the ends of the back door in the vehicle width direction.

CITATION LIST

Patent Literature

Patent Literature 1: Japanese Patent Publication (Kokai) No. 2010-030465

SUMMARY OF INVENTION

Technical Problem

As described in Patent Literature 1, in a back door arranged so that the rear lamps extend inward from the ends in the vehicle width direction, rainwater entering into gaps between the rear lamps and the lamp fitting recesses and retained in these gaps, may flow out from the ends of the back door in the vehicle width direction, when opening or closing the door. The water flowing out in this way may fall onto the operator opening or closing the door or may flow into the luggage compartment of the vehicle.

The present invention has been made in view of the above problem and aims to restrain rainwater which has entered into the gaps between the rear lamps and the lamp fitting recesses from flowing out from the ends of the backdoor in the vehicle width direction when the door is opened or closed.

Solution to Problem

The gist of the present disclosure is as follows.

(1) A rear structure of a vehicle comprising a flip-up type back door for opening and closing an opening formed in a rear part of a vehicle, wherein
the back door comprises: an outer panel which is curved so that a center portion thereof in the vehicle width direction is positioned more outwardly than end portions in the vehicle width direction; and lamp fitting recesses which extend inward from the ends of the back door in the vehicle width direction, which are recessed toward the vehicle inner side, and into which rear lamps are fitted,
the lamp fitting recesses are provided, on its bottom walls, with flow restraint recesses which extend in upward and downward directions within the lamp fitting recesses, which are recessed toward the vehicle inner side, and which restrain liquid flowing outward in the vehicle width direction, and
the lamp fitting recesses are provided with, on portions of the lower walls thereof that are located more outwardly in the vehicle width direction than the flow restraint recesses, inclined parts in which lower walls of the lamp fitting recesses are inclined downward toward the rear of the vehicle or the outside in the vehicle width direction.

(2) The rear structure of a vehicle according to claim 1, wherein the lower walls of the lamp fitting recesses are formed so that, in the inclined parts located more outwardly in the vehicle width direction than the flow restraint recesses, the angle of inclination in the downward direction toward the rear of the vehicle or the outside in the vehicle width direction is greater than that of the portion located more inwardly in the vehicle width direction than the flow restraint recesses.

(3) The rear structure of a vehicle according to claim 1 or 2, wherein the back door further comprises fastening holes used for fastening the rear lamps into the lamp fitting recesses, and
the fastening holes are formed in the bottom walls of the lamp fitting recesses more outwardly in the vehicle width direction than the flow restraint recesses.

(4) The rear structure of a vehicle according to any one of claims 1 to 3, wherein the back door further comprises ribs protruding toward the vehicle outer side, and
the ribs are provided in the lamp fitting recesses more outwardly in the vehicle width direction than the inclined parts.

(5) The rear structure of a vehicle according to any one of claims 1 to 4, wherein the back door further comprises an inner panel located on the vehicle inner side when the back door is closed,
the lamp fitting recesses are formed by shaping the outer panel into a shape of the lamp fitting recesses, and
the inner panel is inclined in accordance with the shape of the inclined parts of the outer panel in a region facing the inclined parts of the outer panel.

Advantageous Effects of Invention

According to the present invention, rainwater which has entered between the rear lamps and the lamp fitting recesses is restrained from flowing from the ends of the back door in the vehicle width direction when the door is opened or closed.

DESCRIPTION OF EMBODIMENTS

Figure 1:
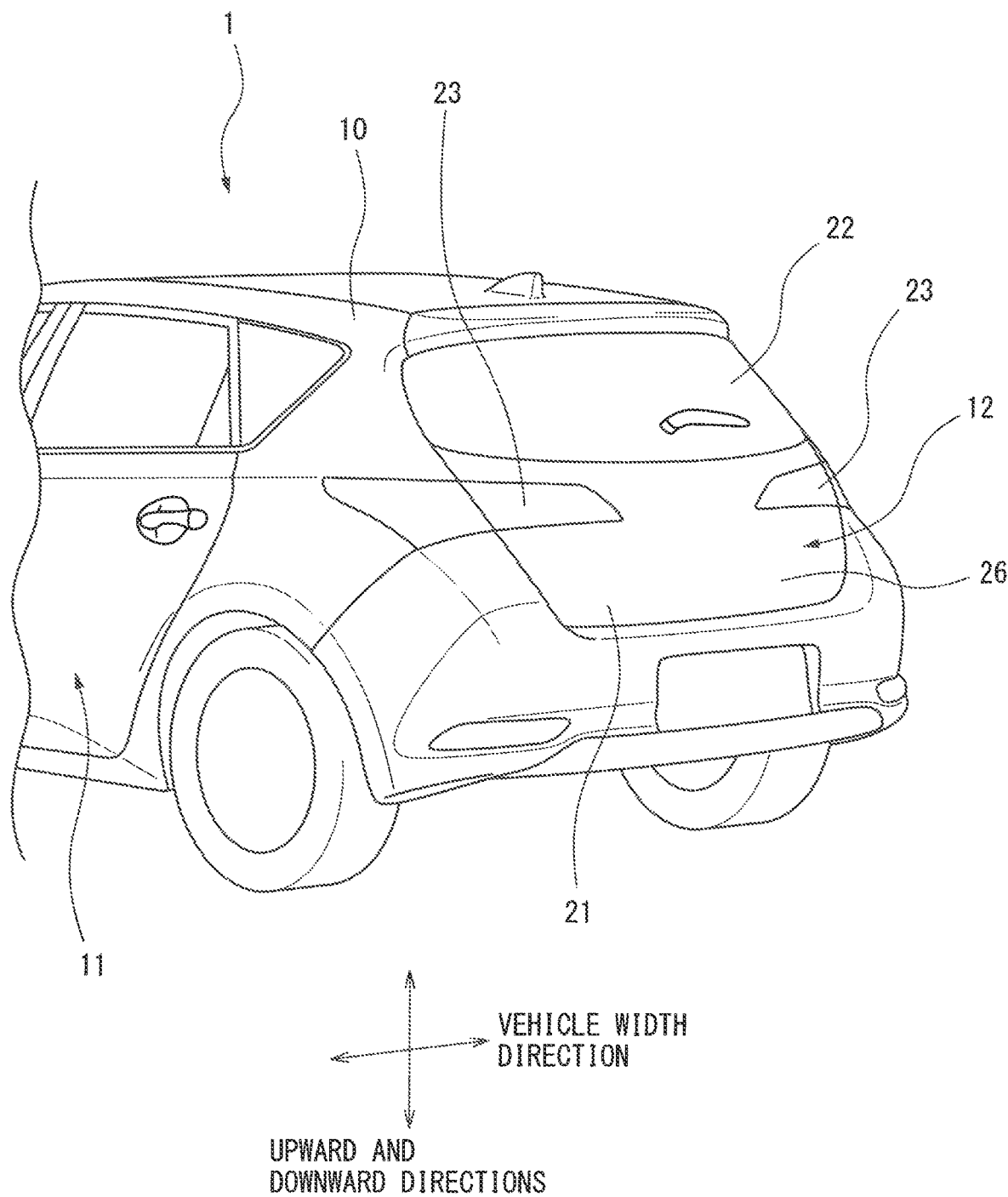
FIG. 1 is a perspective view schematically showing a rear structure of a vehicle, viewed from behind the vehicle.

The embodiments of the present invention will be described in detail below with reference to the drawings. Note that, in the below description, the same constituent elements are given the same reference numerals.

First Embodiment

Configuration of the Vehicle

Figure 2:
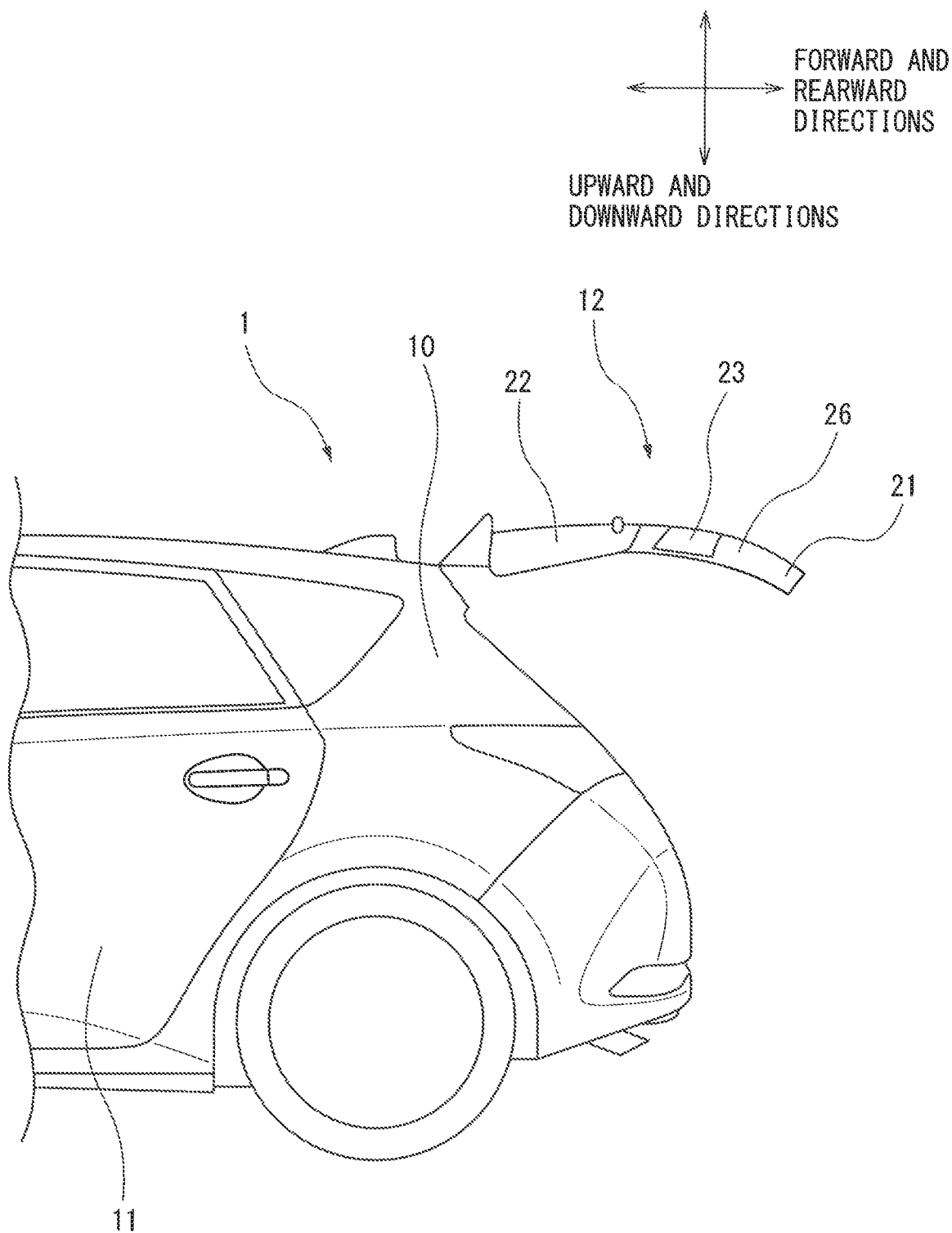
FIG. 2 is a side view of the rear structure of the vehicle.

A vehicle in which the rear structure according to the present embodiment is used will be described with reference to FIGS. 1 and 2. FIG. 1 is a perspective view schematically showing the rear structure of a vehicle according to the present embodiment, viewed from behind the vehicle. FIG. 2 is a side view showing the rear structure of a vehicle according to the present embodiment. Note that in the following description, the directions along the direction of travel of the vehicle are referred to as the vehicle frontward and backward directions, the vertical directions when the vehicle is placed on a horizontal plane are referred to as the vehicle upward and downward directions, and the directions perpendicular to the direction of travel of vehicle and perpendicular to the upward and downward directions of the vehicle are referred to as the vehicle width direction. In the following description of the rear structure of the vehicle, the frontward and backward directions and the upward and downward directions indicate directions in the state in which the back door, which is described later, is closed (the state shown in FIG. 1).

As shown in FIGS. 1 and 2, a vehicle 1 comprises a vehicle body 10, side doors 11, and a flip-up type back door 12. The vehicle body 10 is formed so as to surround the passenger compartment and the engine compartment, and is provided with openings provided on both sides in the vehicle width direction and an opening provided in the rear part.

The side doors 11 are attached to the vehicle body 10 so as to open and close the openings formed on both sides in the width direction of the vehicle body 10 (i.e., formed on both sides in the width direction of the vehicle 1). In particular, the side doors 11 are connected to the vehicle body 10 by hinges on the front sides thereof. Thus, the side doors 11 are rotatable about the front sides thereof and are opened in the width direction of the vehicle 1.

The back door 12 is attached to the vehicle body 10 so as to open and close the opening formed in the rear part of the vehicle body 10 (i.e., formed in the rear part of the vehicle 1). In particular, the back door 12 is connected to the vehicle body 10 by a hinge on the top side thereof. Thus, the back door 12 is rotatable about the top side thereof and is opened in a flip-up manner upwards as shown in FIG. 2. In particular, in the present embodiment, the back door 12 is attached to the vehicle body 10 so as to extend in the upward and downward directions (vertical directions) of the vehicle 1 in a closed state (the state of FIG. 1) and so as to extend in the frontward and backward directions (the horizontal directions) of the vehicle 1 in a fully opened state (the state of FIG. 2).

The outer surface of the back door 12 (i.e., the outer panel, which is described later) is curved so that the center part thereof in the vehicle width direction is positioned more outwardly than both end parts in the vehicle width direction. Thus, the outer surface of the back door 12 is curved so that, when the back door 12 is in a fully opened state, the central part thereof in the vehicle width direction is positioned highest and the outer surface gradually inclined downwardly from the center part in the vehicle width direction towards both ends.

The back door 12 comprises a door body 21, back door glass 22, rear lamps 23, and lamp fitting recesses 24 (refer to FIG. 3) for receiving the rear lamps 23. The door body 21 comprises two panels, i.e., an inner panel 25 (refer to FIG. 5) arranged on the vehicle inner side when the back door 12 is closed, and an outer panel 26 arranged on the vehicle outer side when the back door 12 is closed. The inner panel 25 partially defines the inner surface of the back door 12 and the outer panel 25 partially defines the outer surface of the back door 12. The inner panel 25 and the outer panel 26 may be made of metal or may be made of a resin. An opening is formed in the upper part of the door body 12 and the back door glass 22 is fixed to the door body 21 so as to close this opening.

The rear lamps 23 are positioned in both ends in the vehicle width direction, below the back door glass 22, as shown in FIG. 1. In particular, each rear lamp 23 extends inwards in the vehicle width direction from the end of the back door 12. Furthermore, in the present embodiment, each rear lamp 23 extends in the vehicle width direction and is configured so that the height in the upward and downward directions gradually decreases from the outside in the vehicle width direction toward the inside in the vehicle width direction.

Configuration of the Lamp Fitting Recesses

Figure 3:
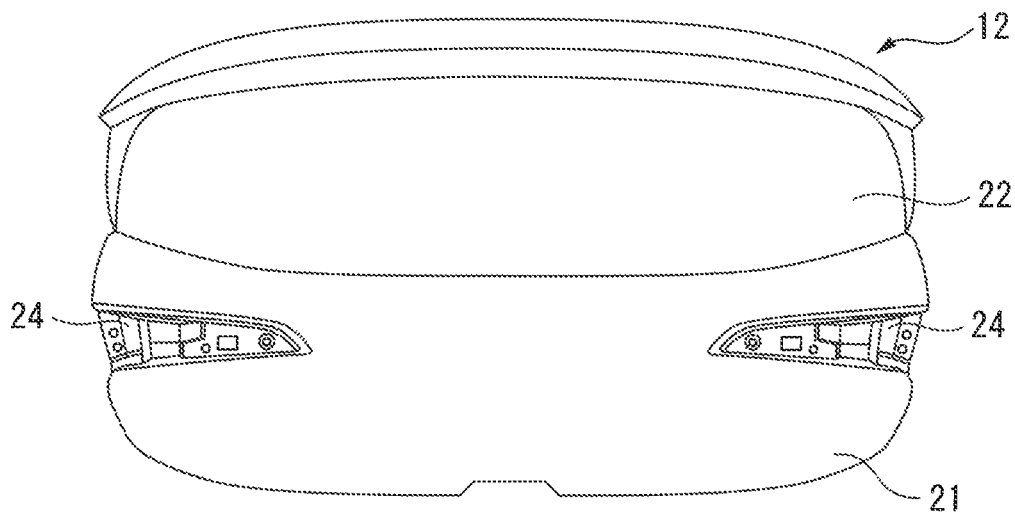
FIG. 3 is a rear view showing the whole back door in a state in which the rear lamps have been removed.
Figure 4:
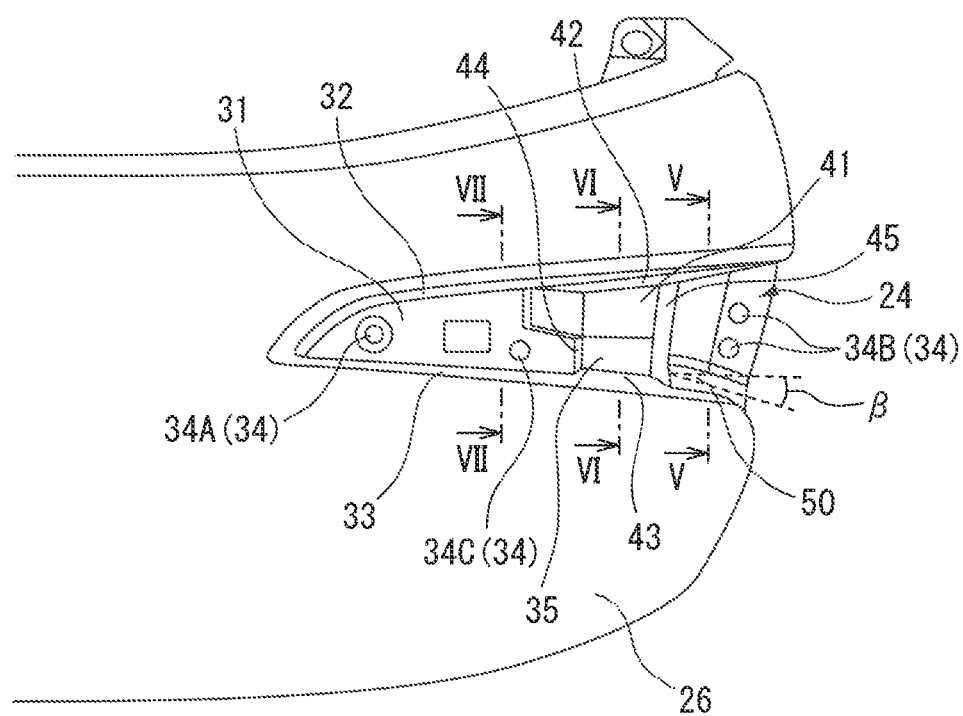
FIG. 4 is a rear view showing a part of an outer panel of a door body.
Figure 5:
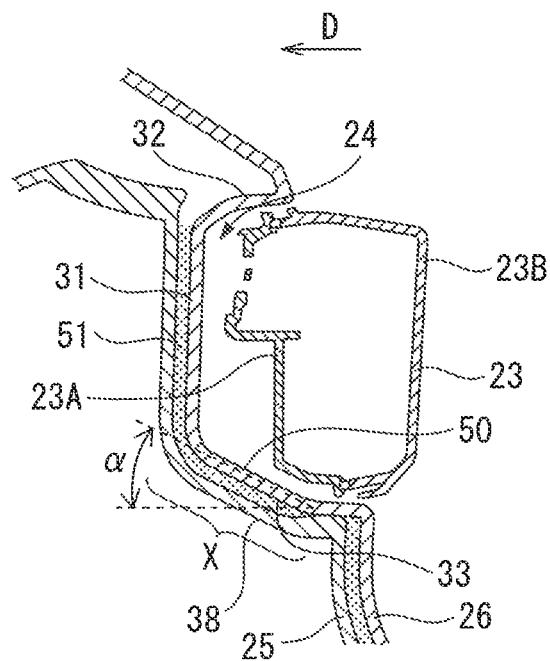
FIG. 5 is a cross-sectional side view of the door body in a state in which the rear lamps have been fitted, viewed along line V-V of FIG. 4.
Figure 6:
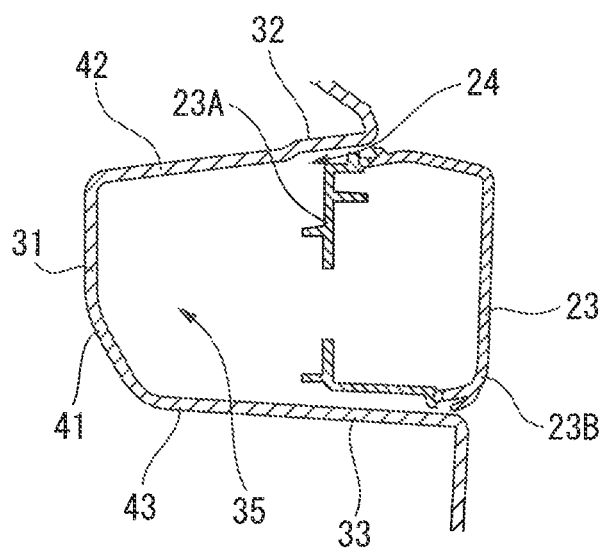
FIG. 6 is a cross-sectional side view of the door body in a state in which the rear lamps have been fitted viewed along line VI-VI of FIG. 4.
Figure 7:
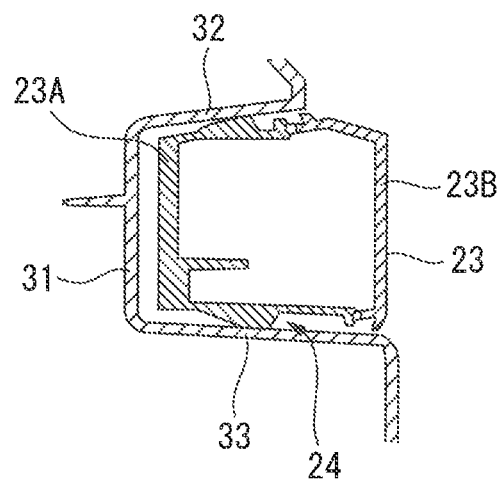
FIG. 7 is a cross-sectional side view of the door body in a state in which the rear lamps have been fitted viewed along line VII-VII of FIG. 4.

Next, the configuration of the lamp fitting recesses 24 will be described with reference to FIGS. 3 to 7. FIG. 3 is a rear view showing the whole of the back door 12 in a state in which the rear lamps 23 have been removed. FIG. 4 is a rear view showing a part of the outer panel 26 of the door body 21. FIGS. 5, 6 and 7 are cross-sectional side views of the door body 21 in a state in which the rear lamps 23 have been attached, viewed respectively along line V-V, line VI-VI, and line VII-VII of FIG. 4.

As can be understood from FIGS. 3 and 4, the lamp fitting recesses 24 are positioned in both ends of the door body 21 in the vehicle width direction, below the back door glass 22. In particular, each of the lamp fitting recesses 24 extends inward from the end of the back door 12 in the vehicle width direction. Thus, each lamp fitting recess 24 is open toward the outside in the vehicle width direction. Furthermore, the lamp fitting recesses 24 are recessed from the outer surface of the door body 21 in the vicinity of the lamp fitting recess 24 toward the vehicle inner side (the front side of the vehicle 1), and thus is open toward the vehicle outer side (the rear side of the vehicle 1).

As can be understood from FIGS. 5 to 7, the lamp fitting recesses 24 comprise bottom walls 31, upper walls 32 connected to the upper ends of the bottom walls 31 and lower walls 33 connected to the lower ends of the bottom walls 31.

In the present embodiment, the bottom walls 31 extend substantially in the upward and downward directions of the vehicle 1. However, the bottom walls 31 need not necessarily extend in the upward and downward directions of the vehicle 1, but may extend in directions other than the upward and downward directions as long as they have a relative angle (e.g., 70 to 90°) with respect to the frontward and backward directions (horizontal plane) of the vehicle 1 to some extent. Furthermore, the bottom walls 31 preferably extend at a relative angle with respect to the frontward and backward directions (horizontal plane) of the vehicle 1 substantially equal to the surface of the outer panel 26 located adjacent to the lamp fitting recesses 24 in the vehicle width direction.

As can be understood from FIGS. 5 to 7, the upper walls 32 and the lower walls 33 extend so as to face each other. The upper walls 32 extend from the upper edge of the bottom walls 31 toward the rear of the vehicle 1, and the lower walls 33 extend from the lower edge of the bottom walls 31 toward the rear of the vehicle 1. Furthermore, the upper walls 32 and the lower walls 33 are inclined so as to approach each other toward the center in the vehicle width direction, and the ends of the upper walls 32 and the lower walls 33 in the center side in the vehicle width direction are connected to each other.

Furthermore, the lamp fitting recesses 24 comprise a plurality of fastening holes 34 and flow restraint recesses 35. The plurality of fastening holes 34 and the flow restraint recesses 35 are both formed in the bottom walls 31.

The plurality of fastening holes 34 are arranged in at least partially different locations in the vehicle width direction. The fastening holes 34A are formed in the bottom walls 31 on the inner side in the vehicle width direction and the fastening holes 34B are formed in the bottom walls 31 on the outer side in the vehicle width direction. In particular, the fastening holes 34B are formed in the bottom walls 31 more outwardly in the vehicle width direction than the flow restraint recesses 35. Furthermore, the fastening holes 34C are formed in the bottom walls 31 between the fastening holes 34A and the fastening holes 34B in the vehicle width direction.

In this regard, the rear lamps 23 are provided with housings 23A and lenses 23B, as shown in FIGS. 5 to 7. The housings 23A open to the vehicle outer side (the rear side of the vehicle 1) when the rear lamps are fitted into the lamp fitting recesses 24, and the lenses 23B are attached to the housings 23A so as to cover the openings. Lightbulbs are arranged in the spaces defined by the housings 23A and the lenses 23B.

Fastening holes (not shown) are provided in the housings 23A of the rear lamps 23 at positions corresponding to the fastening holes 34 formed in the lamp fitting recesses 24. The rear lamps 23 are fixed in the lamp fitting recesses 34 by fasteners inserted through the fastening holes formed in the housings 23A and the fastening holes 34 of the lamp fitting recesses 24. Thus, these fastening holes can be used to attach the rear lamps 23 in the lamp fitting recesses 34.

The flow restraint recesses 35 are arranged in the lamp fitting recesses 24 more outwardly than the center in the vehicle width direction. In particular, the flow restraint recesses 35 are preferably arranged slightly inside the outer edges of the lamp fitting recesses 24 in the vehicle width direction. Furthermore, the flow restraint recesses 35 extend in the upward and downward directions. In particular, in the example shown in FIGS. 3 4, and 6, the flow restraint recesses 35 are formed so as to extend from the upper walls 32 of the lamp fitting recesses 24 to the lower walls 33 of the lamp fitting recesses 24, i.e., entirely in the upward and downward directions within the lamp fitting recesses 24. The flow restraint recesses 35 are recessed towards the vehicle inner side (the front side of the vehicle 1) with respect to the surrounding bottom walls 31, and thus, are open toward the vehicle outer side (the rear side of the vehicle 1).

As can be understood from FIGS. 4 and 6, the flow restraint recesses 35 comprise bottom walls 41, upper walls 42 connected to the upper ends of the bottom walls 41, lower walls 43 connected to the lower ends of the bottom walls 41, inner walls 44 connected to the inner ends of the bottom walls 41 in the vehicle width direction, and outer walls 45 connected to the outer ends of the bottom walls 41 in the vehicle width direction. In the present embodiment, as can be understood from FIG. 4, the flow restraint recesses 35 are formed so as to be substantially rectangular when viewed from the rear of the vehicle toward the front.

In the present embodiment, the bottom walls 41 of the flow restraint recesses 35 extend substantially in the upward and downward directions of the vehicle 1. However, the bottom walls 41 need not necessarily extend in the upward and downward directions of the vehicle 1, but may extend in directions other than the upward and downward directions as long as they have a relative angle (e.g., 70 to 90°) with respect to the frontward and backward directions (horizontal plane) of the vehicle 1 to some extent. Furthermore, the bottom walls 41 of the flow restraint recesses 35 preferably extend at a relative angle with respect to the frontward and backward directions (horizontal plane) of the vehicle 1, substantially equal to the surface of the bottom walls 31 of the lamp fitting recesses 24 surrounding the bottom walls 41 of the flow restraint recesses 35. Additionally, the flow restraint recesses 35 are formed so as to have a volume such that a predetermined amount of water (e.g., 22 cc) can be stored therein when the back door 12 is in a fully opened state.

As can be understood from FIG. 6, the upper walls 42 and the lower walls 43 of the flow restraint recesses 35 extend so as to face each other. In particular, in the present embodiment, the upper walls 42 of the flow restraint recesses 35 extend in the same direction as the upper walls 32 of the lamp fitting recesses 24 and are continuously connected to the upper walls 32 of the lamp fitting recesses 24 without a difference in level. Likewise, in the present embodiment, the lower walls 43 of the flow restraint recesses 35 extend in the same direction as the lower walls 33 of the lamp fitting recesses 24 and are continuously connected with the lower walls 33 of the lamp fitting recesses 24 without a difference in level.

Additionally, the lamp fitting recesses 24 are provided with inclined parts 50 formed in the lower walls 33, more outwardly in the vehicle width direction than the flow restraint recesses 35, as shown in FIGS. 4 and 5. In particular, in the example shown in FIG. 4, the inclined parts 50 extend from the outer ends of the flow restraint recesses 35 in the vehicle width direction (i.e., the outer walls 45) to the outer ends of the lamp fitting recess 24 in the vehicle width directions (i.e., the outer ends of the back door 12).

Furthermore, the inclined parts 50 extend, in the frontward and backward directions of the vehicle 1, from the ends of the lower walls 33 of the vehicle inner side (the ends connected to the bottom walls 31) to the ends of the lower walls 33 of the vehicle outer side (the ends connected to the upper end of the outer panel 26 arranged below the lamp fitting recesses 24). However, the inclined parts 50 may extend only over a portion from the ends of the vehicle inner side to the ends of the vehicle outer side of the lower walls 33.

The inclined parts 50 are formed so as to incline downward toward the rear of the vehicle 1 with respect to the horizontal plane when the vehicle 1 is arranged on the horizontal plane. At this time, the lower limit of the angle (angle α in FIG. 5) between the horizontal plane and the inclined parts 50 is equal to or greater than 5°, is preferably equal to or greater than 7°, and is more preferably equal to or greater than 8°. On the other hand, the upper limit of the angle between the horizontal plane and the inclined parts 50 is less than or equal to 35°, is preferably less than or equal to 30°, and is more preferably less than or equal to 25°.

Additionally, in the present embodiment, the inclined parts 50 are formed so as to incline downward toward the outer side in the vehicle width direction with respect to the horizontal plane when the vehicle 1 is arranged on the horizontal plane. At this time, the lower limit of the angle (angle β in FIG. 4) between the horizontal plane and the inclined parts 50 is equal to or greater than 5°, is preferably equal to or greater than 7°, and is more preferably equal to or greater than 8°. Conversely, the upper limit of the angle between the horizontal plane and the inclined parts 50 is less than or equal to 35°, is preferably less than or equal to 30°, and is more preferably less than or equal to 25°.

Note that in the present embodiment, the inclined parts 50 are inclined downward toward the rear of the vehicle and are inclined downward toward the outer sides in the vehicle width direction. However, the inclined parts 50 may be formed so as to be inclined downward toward the rear of the vehicle, but not inclined downward toward the outer sides in the vehicle width direction. Likewise, the inclined parts 50 may be formed so as to be inclined downward toward the outer sides in the vehicle width direction, but not inclined downward toward the rear of the vehicle. Thus, the inclined parts 50 are formed by the lower walls 33 of the lamp fitting recesses 34 being inclined downward toward the rear of the vehicle or the outer sides in the vehicle width direction.

Note that in the present embodiment, the inclined parts 50 extend linearly from the ends of the vehicle inner side to the ends of the vehicle outer side, and from the ends of the inner side to the ends of the outer side in the vehicle width direction. However, the inclined parts 50 need not necessarily extend linearly. Thus, for example, the inclined parts 50 may be configured so that the angle of incline changes stepwise in the middle of the frontward and backward directions or the vehicle width direction of the vehicle 1, or alternatively, the inclined parts 50 may be configured so that the angle of incline changes continuously in the middle of the frontward and backward directions or the vehicle width directions of the vehicle 1 to form a curved surface.

In the present embodiment, outside the regions in which the inclined parts 50 are provided, the lower walls 33 of the lamp fitting recesses 24 are formed so as to not be substantially inclined with respect to the horizontal plane when the vehicle 1 is arranged on the horizontal plane. Thus, the lower walls 33 of the lamp fitting recesses 24 are formed so that, in the inclined parts 50 located more outwardly in the vehicle width direction than the flow restraint recesses 35, the angle of inclination in the downward direction toward the rear of the vehicle or the outside in the vehicle width direction is greater than that of the portion located more inwardly in the vehicle width direction than the flow restraint recesses 35.

Note that outside the regions in which the inclined parts 50 are provided, the lower walls 33 of the lamp fitting recesses 24 may be formed so as to be slightly inclined with respect to the horizontal plane when the vehicle 1 is arranged on the horizontal plane. However, even in such a case, outside the regions in which the inclined parts 50 are provided, it is necessary that the lower walls 33 of the lamp fitting recesses be formed such that the inclination angle of the downward inclination toward the rear of the vehicle or the outside in the vehicle width direction is smaller than that of the lower walls 33 in the inclined parts 50.

The above-described lamp fitting recess 24, flow restraint recesses 35, inclined parts 50, etc., are all formed in the outer panel 26. In other words, the lamp fitting recesses 24, flow restraint recesses 35, inclined parts 50, etc., are formed by forming the outer panel 26 into the shapes of the lamp fitting recesses 24, flow restraint recesses 35, inclined parts 50, etc.

In contrast thereto, the inner panel 25 is not necessarily formed into shapes conforming to the lamp fitting recesses 24, flow restraint recesses 35, inclined parts 50, etc. However, in order to connect the inner panel 25 and the outer panel 26 in the outer peripheral part of the door body 21, the inner panel 25 is partially formed to match the shape of the outer panel 26 in the outer peripheral part of the door body 21.

In the present embodiment, in the regions in which the lamp fitting recesses 24 are provided more outwardly in the vehicle width direction than the flow restraint recesses 35, the inner panel 25 has a shape which is complementary to the shape of the outer panel 26, as shown in FIG. 5. Thus, as shown in FIG. 5, the inner panel 25 is provided with, in the regions facing the inclined parts 50 formed in the outer panel 26 when connected with the outer panel 26, inclined parts 38 which are inclined in accordance with the shape of the inclined parts 50 of the outer panel 26. Likewise, as shown in FIG. 5, the inner panel 25 is formed, in the region facing the bottom walls 31 of the lamp fitting recess 24 formed in the outer panel 26 when connected with the outer panel 26, so as to extend in accordance with the shape of the bottom walls 31 of the outer panel 26.

In the present embodiment, adhesive 51 is applied between the above-described inner panel 25 and the outer panel 26 in the regions in which the inner panel 25 and outer panel 26 are complementarily formed. Thus, the inner panel 25 and the outer panel 26 are bonded by the adhesive 51 in the regions in which the inner panel 25 and the outer panel 26 are complimentarily formed. As the adhesive 51 used for bonding, any adhesive commonly used in the production of automobiles, such as a urethane adhesive, may be used.

Mode of Operation and Effect

Next, the mode of operation and effect of the rear structure of the vehicle 1 according to the above-described embodiment will be described.

As described above, the rear lamps 23 are fitted into the lamp fitting recesses 24, and rainwater enters and is retained in the gaps between the rear lamps 23 and the lamp fitting recesses 24. In this regard, in the present embodiment, the rear lamps 23 are arranged in the back door 12 so as to extend inward from the ends of the back door 12 in the vehicle width direction. Thus, if the flow restraint recesses 35, inclined parts 50, etc., of the present embodiment were not provided, the rainwater retained in the gaps between the rear lamps 23 and the lamp fitting recesses 24 may flow out from the ends of the back door in the vehicle width direction when the back door 12 is opened or closed.

In contrast thereto, in the present embodiment, the flow restraint recesses are provided in the lamp fitting recesses 24 relatively outwardly in the vehicle width direction. The flow restraint recesses 35 are recessed downwardly in the vertical direction when the back door 12 is in a fully-opened state. Thus, even if rainwater retained in the gaps between the rear lamps 23 and the lamp fitting recesses 24 more inwardly in the vehicle width direction than the flow restraint recesses 35 flows through the lamp fitting recesses outwardly in the vehicle width direction when the back door 12 is opened, the rainwater is stored in the flow restraint recesses 35 and does not flow further outwardly in the vehicle width direction. As a result, the rainwater retained in the above-described spaces more inwardly in the vehicle width direction than the flow restraint recesses 35 is restrained from flowing down from the ends in the vehicle width direction when the back door 12 is opened or closed. Thus, the flow restraint recesses 35 restrain liquids such as rainwater from flowing outwardly in the vehicle width direction.

On the other hand, rainwater entering the spaces between the rear lamps 23 and the lamp fitting recesses 24 more outwardly in the vehicle width direction than the flow restraint recesses 35 will not be stored in the flow restraint recesses 35 if flowing outwardly in the vehicle width direction when back door 12 is opened. However, in the present embodiment, inclined parts 50 are provided in the lower walls 33 of the lamp fitting recesses 24 in the regions more outwardly in the vehicle width direction than the flow restraint recesses 35.

Thus, the rainwater which has entered the above-mentioned gaps more outwardly in the vehicle width direction than the flow restraint recesses 35 flows out from the lower ends of the lamp fitting recesses 24 over the inclined parts 50 when the back door 12 is in a closed state. Therefore, substantially no rainwater which has entered into the above-described gaps more outwardly in the vehicle width direction than the flow restraint recesses 35 is retained in the gaps. Since substantially no rainwater is retained in the gaps more outwardly in the vehicle width direction than the flow restraint recesses 35, even if the back door is opened, the rainwater is restrained from running down from the ends in the vehicle width direction.

According to the present embodiment, by providing the flow restraint recesses 35 and inclined parts 50, it is possible to restrain rainwater which has entered between the rear lamps 23 and the lamp fitting recesses 24 from flowing down from the ends of the back door in the vehicle width direction, when the door is opened or closed.

Outside the regions in which the inclined parts 50 are provided, the lower walls 33 of the lamp fitting recesses 24 are formed so as to have an angle smaller than that of the lower walls 33 of the inclined parts 50, and in the above-described embodiment, are formed so as to not be substantially inclined. As a result, outside of the regions in which the inclined parts 50 are provided, it becomes possible to secure sufficient space for the rear lamps 23 toward the front of the vehicle. As a result, it is possible to sufficiently secure the region in which the light emitting part is provided in the rear lamp 23, and it is possible to enlarge the light emitting range of the rear lamps 23.

Figure 8:
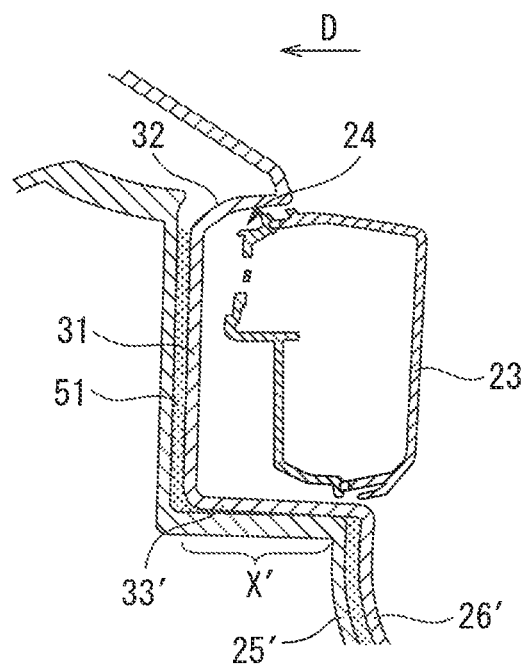
FIG. 8 is a cross-sectional side view, similar to FIG. 5, of the door body viewed along line V-V of FIG. 4 in the case in which inclined parts are not provided.

Furthermore, according to the present embodiment, it is possible to enhance the adhesiveness of the adhesive 51 between the inner panel 25 and the outer panel 26 in the inclined parts 50. This will be described below using FIG. 8. FIG. 8 is a cross-sectional side view, similar to FIG. 5, of the door body 21 viewed along line V-V of FIG. 4 in the case in which inclined parts 50 are not provided.

As shown in FIG. 8, in the case in which the inclined parts 50 are not provided in the lower walls 33' of the lamp fitting recesses 24, the lower walls 33' extend in the frontward and backward directions of the vehicle 1. In this case, it is necessary to bond the inner panel 25' and the outer panel 26' in the region of the lower wall 33' as well. Thus, the inner panel 25' is formed into a shape conforming to the lower wall 33', as shown in FIG. 8.

In this regard, in the production of the back door 12, the outer panel 26 is attached to the inner panel 25'. Normally at this time, the outer panel 26' is attached to the inner panel 25' by relatively moving the outer panel 26' in the frontward and backward directions (the direction of the arrow D in the drawing) of the vehicle 1 relative to the inner panel 25'. By moving the outer panel 26' in this direction relative to the inner panel 25', the adhesive 51 which has been applied to the lower surface of the lower walls 33' of the outer panel 26' or the adhesive 51 (the adhesive of the region indicated by X' in the drawing) which has been applied to the portion facing the lower walls 33' of the inner panel 25' is scraped off during movement. As a result, in the case in which the inclined parts 50 are not provided in the lower walls 33' of the lamp fitting recesses 24, as shown in FIG. 8, the adhesiveness between the inner panel 25' and the outer panel 26' in the region of the lower walls 33' is reduced.

In contract thereto, according to the present embodiment, the inclined parts 50 are provided in the lower walls 33 of the lamp fitting recesses 24, as shown in FIG. 5. Thus, in these regions, the surface of the inner panel 25 and the surface of the outer panel 26 are inclined with respect to the direction of relevant movement (arrow D in the drawing) of the outer panel 26 during production. Thus, during production, the scraping off of adhesive when the outer panel 26 is moved relative to the inner panel 25 can be restrained. Therefore, according to the present embodiment, it is possible to restrain a reduction in adhesion between the inner panel and the outer panel in the region indicated by X in the drawing.

Furthermore, in the present embodiment, the fastening holes 34B are formed in the bottom walls 31 more outwardly in the vehicle width direction than the flow restraint recesses 35. Thus, the fastening holes 34B are arranged relatively outwardly in the vehicle width direction. By fastening the rear lamps 23 outwardly in the vehicle width direction in this way, it is possible to attach the rear lamps 23 more stably.

Second Embodiment

Next, a rear structure of a vehicle according to a second embodiment will be described with reference to FIGS. 9 and 10. The rear structure of a vehicle according to the second embodiment is basically the same as the rear structure of a vehicle according to the first embodiment. Thus, the rear structure of a vehicle according to the second embodiment will be described below focusing on the portions which differ from the rear structure of a vehicle according to the first embodiment.

Figure 9:
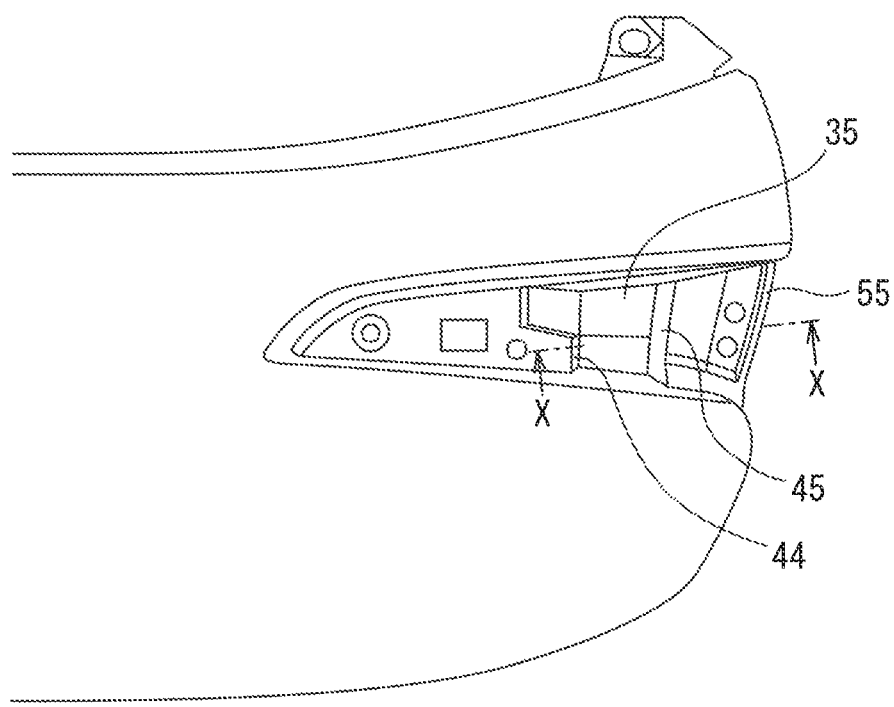
FIG. 9 is a rear view, similar to FIG. 4, showing a part of the outer panel of the door body according to a second embodiment.

FIG. 9 is a rear view, similar to FIG. 4, showing one part of the outer panel 26 of the door body 21 according to the second embodiment. Furthermore, FIG. 10 is a cross-sectional plan view of the outer panel as viewed along line X-X in FIG. 9.

Figure 10:
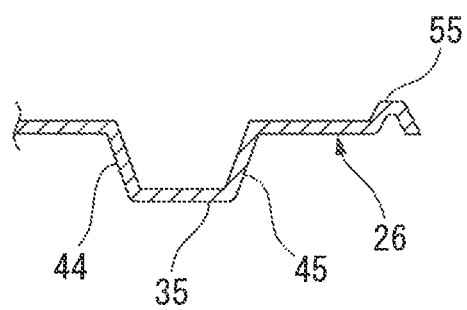
FIG. 10 is a cross-sectional plan view of the outer panel viewed along line X-X of FIG. 9.

As can be understood from FIGS. 9 and 10, in the present embodiment, the lamp fitting recesses 24 are provided with ribs 55. The ribs 55 are formed in the lamp fitting recesses 24 most outwardly of the lamp fitting recesses 24 in the vehicle width direction. Thus, the ribs 55 are provided in the lamp fitting recesses 24 more outwardly in the vehicle width direction than the flow restraint recesses 35 and the inclined parts 50.

Furthermore, the ribs 55 are formed so as to extend in the upward and downward directions of the vehicle 1 and protrude on the vehicle outer side (the rear side of the vehicle 1). In particular, in the present embodiment, the ribs 55 extend through the upward and downward directions of the lamp fitting recesses 24, i.e., from the upper walls 32 to the lower walls 33.

In the present embodiment, the ribs 55 are formed by deforming the outer panel 26 so as to protrude toward the vehicle outer side, as shown in FIG. 10. Note that the ribs 55 may be formed by welding a separate material onto the flat outer panel 26 or the like.

The mode of operation and effect of the rear structure of the vehicle 1 according to the second embodiment will be described. In the rear structure of the vehicle 1 according to the above-described first embodiment, in which the inclined parts are provided, there is a risk that rainwater will be retained in the gaps between the rear lamps 23 and the lamp fitting recesses 24 more outwardly in the vehicle width direction than the flow restraint recesses 35 when the vehicle 1 is stopped on a steep incline. However, according to the rear structure of the vehicle 1 according to the present embodiment, even if rainwater is retained in the above-described gaps more outwardly in the vehicle width direction than the flow restraint recesses 35, when the back door 12 is opened or closed, the retained rainwater can be restrained from flowing out from the ends in the vehicle width direction.

REFERENCE SIGNS LIST 1. vehicle
10. vehicle body
11. side door
12. back door
21. door body
22. back door glass
23. rear lamp
24. lamp fitting recess
25. inner panel
26. outer panel
31. bottom wall
32. upper wall
33. lower wall
34. fastening hole
35. flow restraint recess
50. inclined part

The invention claimed is:

1. A rear structure of a vehicle comprising a flip-up type back door for opening and closing an opening formed in a rear part of a vehicle, wherein the back door comprises: an outer panel which is curved so that a center portion thereof in the vehicle width direction is positioned more outwardly than end portions in the vehicle width direction; and lamp fitting recesses which extend inward from the ends of the back door in the vehicle width direction, which are recessed toward the vehicle inner side, and into which rear lamps are fitted, the lamp fitting recesses are provided, on its bottom walls, with flow restraint recesses which extend in upward and downward directions within the lamp fitting recesses, which are recessed toward the vehicle inner side, and which restrain liquid flowing outward in the vehicle width direction, and the lamp fitting recesses are provided with, on portions of the lower walls thereof that are located more outwardly in the vehicle width direction than the flow restraint recesses, inclined parts in which lower walls of the lamp fitting recesses are inclined downward toward the rear of the vehicle or the outside in the vehicle width direction.

2. The rear structure of a vehicle according to claim 1, wherein the lower walls of the lamp fitting recesses are formed so that, in the inclined parts located more outwardly in the vehicle width direction than the flow restraint recesses, the angle of inclination in the downward direction toward the rear of the vehicle or the outside in the vehicle width direction is greater than that of the portion located more inwardly in the vehicle width direction than the flow restraint recesses.

3. The rear structure of a vehicle according to claim 1, wherein the back door further comprises fastening holes used for fastening the rear lamps into the lamp fitting recesses, and the fastening holes are formed in the bottom walls of the lamp fitting recesses more outwardly in the vehicle width direction than the flow restraint recesses.

4. The rear structure of a vehicle according to claim 1, wherein the back door further comprises ribs protruding toward the vehicle outer side, and the ribs are provided in the lamp fitting recesses more outwardly in the vehicle width direction than the inclined parts.

5. The rear structure of a vehicle according to claim 1, wherein the back door further comprises an inner panel located on the vehicle inner side when the back door is closed, the lamp fitting recesses are formed by shaping the outer panel into a shape of the lamp fitting recesses, and the inner panel is inclined in accordance with the shape of the inclined parts of the outer panel in a region facing the inclined parts of the outer panel.

* * * * *